United States Patent
Beardsley et al.

(10) Patent No.: US 8,636,124 B2
(45) Date of Patent: Jan. 28, 2014

(54) COATED POWER RAIL

(75) Inventors: M. Brad Beardsley, Laura, IL (US);
Daniel Herbert Gerke, Chillicothe, IL (US); Robert E. Sharp, Corinth, MS (US); Mike Bridges, Luka, MS (US)

(73) Assignee: Caterpillar Inc., Peoria, IL (US)

( * ) Notice: Subject to any disclaimer, the term of this patent is extended or adjusted under 35 U.S.C. 154(b) by 260 days.

(21) Appl. No.: 12/888,711

(22) Filed: Sep. 23, 2010

(65) Prior Publication Data
US 2012/0073923 A1     Mar. 29, 2012

(51) Int. Cl.
*B60M 1/30*     (2006.01)

(52) U.S. Cl.
USPC .................................... 191/22 DM

(58) Field of Classification Search
USPC ................ 191/22 R, 29 R–29 DM, 22 DM
See application file for complete search history.

(56) References Cited

U.S. PATENT DOCUMENTS

| | | |
|---|---|---|
| 3,399,281 A | 8/1968 | Corl |
| 3,872,577 A * | 3/1975 | Kugler et al. ................. 228/208 |
| 3,914,178 A | 10/1975 | Fineran et al. |
| 4,126,295 A | 11/1978 | Natalizia |
| 4,758,025 A | 7/1988 | Frick |
| 5,126,514 A * | 6/1992 | Bommart ................. 191/22 DM |
| 5,310,032 A * | 5/1994 | Plichta ..................... 191/29 DM |
| 6,290,032 B1 | 9/2001 | Patrick et al. |
| 6,497,772 B1 * | 12/2002 | Meckel et al. ................ 148/254 |
| 7,043,819 B1 * | 5/2006 | Arnold ......................... 29/527.2 |
| 2010/0044175 A1 | 2/2010 | Woempner et al. |

FOREIGN PATENT DOCUMENTS

| | | |
|---|---|---|
| CN | 101270700 A | 9/2008 |
| DE | 2546026 A1 | 4/1977 |
| EP | 535865 A1 | 4/1993 |
| FR | 2697452 A1 | 5/1994 |
| WO | WO 99/20840 A1 | 4/1999 |
| WO | WO 2008/000579 A1 | 1/2008 |

OTHER PUBLICATIONS

Conversion Coatings, downloaded from http://www.anoplate.com/finishes/conversioncoatings.html on Mar. 31, 2010, (2 pages).
Surface Technology Inc., Products & Services, downloaded from http://www.surfacetechnology.com/cdc.htm on Mar. 31, 2010 (4 pages).

* cited by examiner

*Primary Examiner* — R. J. McCarry, Jr.
(74) *Attorney, Agent, or Firm* — Finnegan, Henderson, Farabow, Garrett & Dunner LLP

(57) ABSTRACT

A power rail includes an aluminum body and a wear coating including stainless steel. The power rail may also include a break-in coating having a lower hardness than the wear coating.

20 Claims, 2 Drawing Sheets

COATED POWER RAIL

TECHNICAL FIELD

The present disclosure relates generally to coated power rails, and more particularly, to a power rail with a wear coating and a break-in coating applied thereon.

BACKGROUND

Solid surfaces in contact undergo relative motion experience wear due to friction. Wear is the progressive loss of material due to interacting surfaces in relative motion. Excessive wear often leads to premature failure of a part. Intrinsic material properties such as hardness, strength, ductility, etc. are important factors that determine the wear resistance of the material. The surface condition of interacting parts also play an important role in the amount of wear experienced by the part. When two surfaces are in contact, surface roughness causes contact to occur at discrete contact areas. The localized contact increases local stresses, and thereby wear, at these contact areas. Therefore, smooth surfaces typically experience less wear than rough surfaces. Solid surfaces, irrespective of their method of formation, generally contain surface irregularities. Therefore, a part may be subject to some post-fabrication finishing or polishing operations to reduce its surface roughness before being used in an application where wear resistance is a consideration.

In some applications, considerations other than wear resistance (such as, electrical or thermal conductivity) may drive the selection of material for a part that may be used in a wear related application. A power conducting rail ("power rail") that delivers power to a moving device is an example of an application where the rail may be fabricated from aluminum due to its high electrical conductivity. Examples of such applications include conductor bars that deliver power to moving equipment such as overhead cranes and other material transportation systems, and third rails that deliver power to electric trains. The moving devices (crane, material handling system, train, etc.) have metal contact blocks called "shoes" that make contact with a surface of the power rail during operation. Therefore, surfaces of the power rail that interact with the shoes may be subject to wear. To reduce wear related failures, a strip of material (or a cap) made of a sufficiently wear resistant material (such as stainless steel) may be attached to the surface of the power rail that interacts with the shoes. To reduce wear of the rail and the shoes, the surfaces of the cap that may be subject to wear may be smoothed before the cap is attached to the rail.

EP535865 B1 ("the '865 patent") discloses a rail with an aluminum main body and a stainless steel cap. The stainless steel cap is welded to the main body to form a surface that will contact the wheels of a train. In the '865 patent, the cap is separately formed and mechanically bonded to the aluminum rail. Since the cap is separately formed, the surface of the cap may be finished to reduce its surface roughness before being welded to the rail. While the stainless steel cap of the '865 patent may provide wear resistance to the aluminum rail, it has disadvantages. For instance, the fabrication and finishing of the cap and the welding of the cap on the rail may require capital equipment investment, and therefore increase costs.

The disclosed coated power rails are directed at overcoming these and/or other shortcomings in existing technology.

SUMMARY

In one aspect, a power rail is disclosed. The power rail may include an aluminum body and a wear coating including stainless steel. The power rail may also include a break-in coating having a lower hardness than the wear coating.

In another aspect, a method of forming a wear surface on a power rail is disclosed. The method may include applying a wear coating of stainless steel on a surface of the power rail. The method may also include applying a break-in coating of less hardness than the wear coating on a surface of the wear coating.

In yet another aspect, a v-grooved power rail is disclosed. The power rail may include an aluminum body and a wear coating deposited on a v-grooved surface of the power rail by a thermal spray process. The power rail may also include a break-in coating having a lower hardness than the wear coating deposited on the wear coating using a thermal spray process.

DETAILED DESCRIPTION

Figure 1:
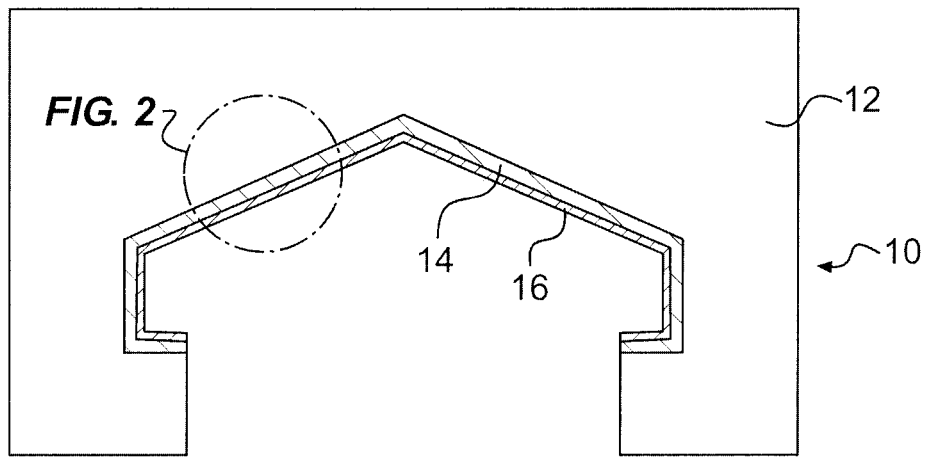
FIG. 1 is an illustration of a power rail with an exemplary break-in coating.

FIG. 1 illustrates an exemplary coated power rail 10 of the current disclosure. Power rail 10 may include an aluminum body 12 with a wear coating 14 and a break-in coating 16 applied thereon. In general, wear coating 14 maybe a deposited layer of stainless steel on body 12. Break-in coating 16 may be applied on a surface of the wear coating 14. Break-in coating 16 may also be a deposited layer on the surface of the wear coating 14. In general, break-in coating 16 may be made of a softer material than the material of the wear coating. In embodiments where wear coating 14 includes stainless steel, break-in coating 16 may include materials such as copper, bronze, aluminum, tin, and/or zinc. Although the cross-sectional shape of a v-grooved power rail used to supply electric power to an overhead crane and other electric vehicles is illustrated in FIG. 1, power rail 10 may include any cross-section shape. For example, the cross-sectional shape of power rail 10 may include that of a conventional power rail used in electric railways and rapid transit systems.

Figure 2:
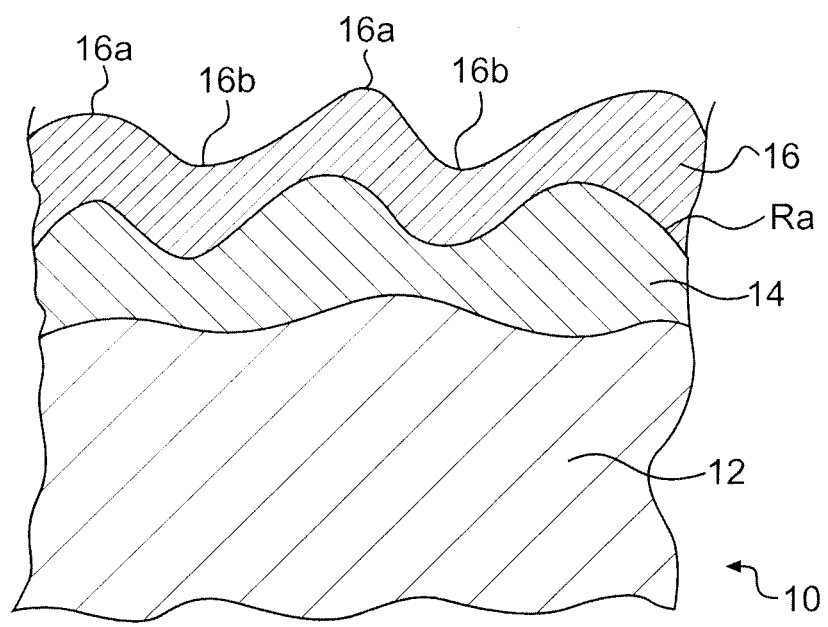
FIG. 2 is an enlarged view of a region of the power rail identified in FIG. 1.

FIG. 2 shows an enlarged view of a region of power rail 10 identified in FIG. 1. Although the surface of body 12 is shown to be smooth in FIGS. 1 and 2, in some embodiments, the surface of body 12 may be grooved or otherwise roughened to improve the adhesion of wear coating 14 on body 12. As noted above, in general, wear coating 14 may be a deposited layer of material on aluminum body 12. Any known deposition technique may be used to deposit wear coating 14 on aluminum body 12. In some embodiments, a thermal spray technique may be used to deposit wear coating 14 on aluminum body 12. As compared with a layer of material attached to the power rail using a technique such as welding, soldering, mechanical fastening, etc., a deposited coating may decrease the cost of coating application and improve performance. For instance, a deposited coating may have better contact between the base material and the coating. This better contact may decrease the electrical resistance of the interface.

Thermal spraying techniques form a coating on a body by melting a consumable material (target material) into droplets and impinging these droplets on the body 12. Some of the more common thermal spraying processes include flame spraying, plasma arc spraying, electric arc spraying, detonation gun, and high-velocity oxygen fuel (HVOF). The target material (that is, the material to be deposited as the coating) is typically fed into a spray gun as a powder or a wire, where the material may be atomized and accelerated toward a surface of body 12. In the spray gun, the particles of the target material may be heated to a malleable state before being propelled at high velocity to the body 12. As the atomized particles impinge upon the body 12, they cool and build up into a laminar structure forming the coating. As the molten or semi-molten particles impinge upon the body 12 at high velocities, mechanical bonding occurs between the materials across the interface. Over time, the impinging particles may produce a uniform wear coating 14 on body 12.

In general, any thermal spray technique may be used to deposit wear coating 14 on body 12. In some embodiments, arc spraying may be used to deposit the wear coating 14. Arc spraying is a high throughput thermal spraying process in which an electric arc is struck between two continuous consumable wire electrodes that form the spray material. Compressed gas (air, etc.) atomizes the molten spray material into fine droplets and propel them towards body 12 to form the wear coating 14. In some embodiments a different thermal spray technique, such as, HVOF may be used to deposit the wear coating 14. Since these techniques are well known in the art, for the sake of brevity, these are not described herein.

Wear coating may include a stainless steel material. Any composition of stainless steel may be used as wear coating 14. In some embodiments, a 300 series stainless steel may be used as wear coating 14 because of its superior corrosion properties and good thermal expansion match with the substrate material. Since power rail 10 is used in an electrical power conducting application, the electrical properties of wear coating 14 is a consideration in selecting the thickness of wear coating 14. For acceptable power conducting characteristics, the electrical resistance of wear coating 14 and the interface of wear coating 14 and body 12 should preferably be less than or equal to that of the bulk coating material. While increased thickness of wear coating 14 generally improves mechanical wear resistance, a thick coating may adversely affect electrical performance and increase cost. A thick wear coating may also have higher residual stresses and may be more subject to peeling. To achieve sufficient mechanical wear resistance while maintaining cost, performance, and reliability within acceptable levels, the thickness of wear coating 14 is between about 0.1 to about 2 mm. In some preferred embodiments, the thickness of wear coating 14 is between about 1 to about 1.5 mm, and in more preferred embodiments, the thickness of wear coating 14 is about 1.5 mm. After deposition, a surface of wear coating 14 may exhibit a roughness. In some embodiments, an average roughness of the wear coating surface may be between about 5 and 15 microns $R_a$. Since the parameter average roughness ($R_a$) and the method of measuring this parameter are well known in the industry, and are defined in standards such as ISO 4287:1997 section 4.2.1 and ASME B46.1-2002, they are not described herein.

Wear coating 14 may be applied to any surface of body 12 that experiences mechanical wear. In an application where the shoes of an overhead crane or another device contact the power rail 10, wear coating 14 may be applied to the surfaces of the power rail 10 that contact the shoes. In general, wear coating 14 may be applied to any surface of power rail 10. In some embodiments, wear coating 14 may be applied to all external surfaces of power rail 10. Due to the surface roughness of the deposited wear coating, the surface of a shoe that interfaces with the coated power rail surface may be subject to wear. To reduce the mechanical wear of the shoe, a post fabrication technique (such as, finishing, etc.) may be applied to the coated surface of the power rail 10. However, application of such a post fabrication technique may increase cost. Therefore, a break-in coating 16 is applied to the wear coating 14 to decrease the surface roughness of the wear coating 14 without employing a conventional post fabrication technique such as finishing.

A break-in coating 16 is deposited to a surface of wear coating 14 by the same technique described above to apply the wear coating 14 (for example, using a thermal spray technique such as, arc spraying, HVOF, etc.). In some embodiments, the break-in coating 16 may be applied to all surfaces of power rail 10 that include wear coating 14, while in other embodiments, break-in coating 16 may only be applied to those surfaces of power rail 10 that is expected to experience mechanical wear. While break-in coating 16 may generally be applied by the same technique used to apply wear coating 14, this is not a requirement. For example, in some embodiments, both wear coating 14 and break-in coating 16 may be applied by different techniques. Break-in coating 16 may include a material having a higher electrical conductivity and a lower hardness than the wear coating 14. In some embodiments, break-in coating 16 may include bronze, copper, aluminum, tin, and/or zinc. In some embodiments, break-in coating 16 may almost entirely be made of a single material, while in other embodiments, break-in coating 16 may include multiple materials in the form of an alloy of multiple materials, or layers of different materials. The thickness of break-in coating 16 may be between about 10 and 50 microns. In preferred embodiments, the thickness of the break-in coating 16 may be between about 20 and 30 microns. In general, the smaller the roughness of the wear coating 14, the lower the thickness of the break-in coating 16 that may be applied. In some embodiments, the thickness of break-in coating 16 may of the same order of magnitude as the roughness of wear coating 14. Similar to the surface of wear coating 14, the surface of the break-in coating 16 may also exhibit roughness and include multiple hillocks 16a and valleys 16b (see FIG. 2).

Figure 3:
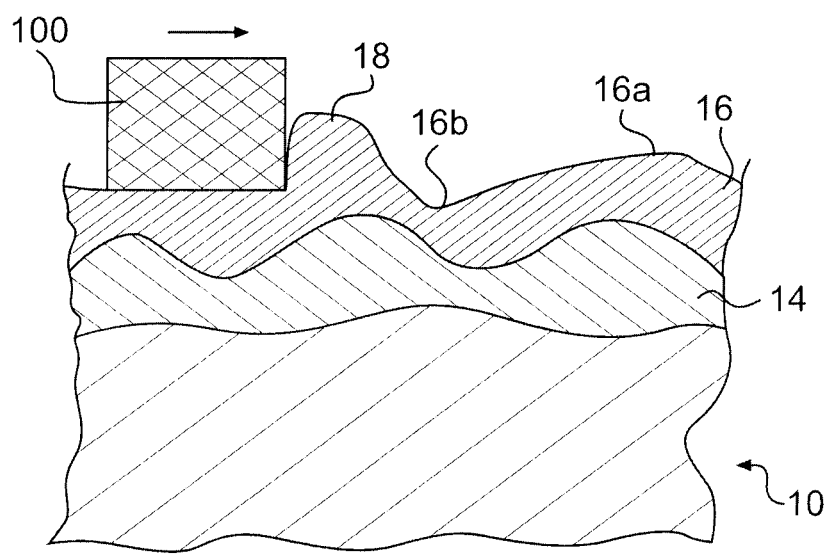
FIG. 3 is an illustration of an application of the power rail of FIG. 1.

During application, power rail 10 provides electrical power to a moving overhead crane. To transmit the power from power rail 10 to the moving crane, shoes attached to the crane maintain physical contact with the v-grooved surface of power rail 10 as the crane moves. The rubbing contact of the shoes with power rail 10 may subject the power rail 10 and shoes to mechanical wear. The wear coating 14 made of a relatively hard material may provide wear resistance to the power rail 10, and the break-in coating 16 made of a relatively soft material may reduce wear of the shoes by decreasing the surface roughness of the wear coating 14. FIG. 3 illustrates a shoe 100 of an overhead crane (not shown) in contact with a coated surface of power rail 10. As the shoe 100 rubs and moves along power rail 10, some of the material 18 of the relatively soft break-in coating 16 may get displaced from the hillocks 16a and get deposited on the valleys 16b. Repeated interaction of the shoes 100 with the power rail 10 may further remove material 18 from the hillocks 16a and deposit the material 18 on the valleys 16b to create a relatively smooth surface of power rail 10. This relatively smooth surface may reduce wear of the shoes.

INDUSTRIAL APPLICABILITY

The coated power rail of the present disclosure may be applicable to any application where it is desired to lower the mechanical wear of the power rail and the shoes that interface with the power rail. These power rails may be used in any application where electrical power is supplied to a moving device. In an exemplary embodiment, the power rail of the current disclosure may be used to supply power to an overhead crane.

A break-in coating of a relatively soft material is applied on a stainless steel wear coating that is deposited on the aluminum substrate of a v-grooved power rail used to supply power to an overhead crane or a small electric train. During operation, some of the material of the break-in coating may get displaced and fill the valleys on the surface of the wear coating. As a result, the surface roughness of the wear coating may be decreased. The wear coating improves the wear resistance of the power rail, and the break-in coating reduces wear on the shoes by decreasing the surface roughness of the wear coating. The coatings of the current disclosure provide a cost effective and efficient technique for providing wear resistance to a power rail without increasing the mechanical wear of a shoe that interfaces with the power rail.

It will be apparent to those skilled in the art that various modifications and variations can be made to the disclosed coated power rail. Other embodiments will be apparent to those skilled in the art from consideration of the specification and practice of the disclosed coated power rail. It is intended that the specification and examples be considered as exemplary only, with a true scope being indicated by the following claims and their equivalents.

We claim:

1. A power rail, comprising:
    an aluminum body;
    a wear coating deposited on a surface of the aluminum body, the wear coating including stainless steel; and
    a break-in coating disposed on an exposed top surface of the wear coating, the break-in coating having a lower hardness than the wear coating.

2. The power rail of claim 1, wherein the wear coating is deposited on the aluminum body by a thermal spray technique.

3. The power rail of claim 1, wherein the break-in coating is applied by a deposition process on the wear coating.

4. The power rail of claim 1, wherein the break-in coating includes at least one of copper, bronze, aluminum, tin, or zinc.

5. The power rail of claim 1, wherein a thickness of the wear coating is between about 0.1 mm to about 2 mm.

6. The power rail of claim 1, wherein a thickness of the wear coating is between about 1 mm to about 1.5 mm.

7. The power rail of claim 1, wherein a thickness of the wear coating is about 1.5 mm.

8. The power rail of claim 1, wherein an average surface roughness of the wear coating is between about 5 to about 15 microns Ra.

9. The power rail of claim 1, wherein a thickness of the break-in coating is between about 10 microns to about 50 microns.

10. The power rail of claim 1, wherein the aluminum body is a power conducting bar for an over head crane.

11. The power rail of claim 10, wherein the wear coating is applied on a v-groove of the power conducting bar.

12. A method of forming a wear surface on a power rail, comprising:
    depositing a wear coating of stainless steel on a surface of the power rail; and
    providing a break-in coating on an exposed top surface of the wear coating, the break-in coating having a lower hardness than the wear coating.

13. The method of claim 12, wherein depositing a wear coating includes depositing a wear coating by a thermal spray technique.

14. The method of claim 12, wherein providing a break-in coating includes depositing a break-in coating of one of copper, bronze, aluminum, tin, or zinc by a thermal spray technique.

15. The method of claim 12, wherein depositing a wear coating includes depositing a wear coating having a thickness between about 0.1 mm and about 2 mm.

16. The method of claim 12, wherein depositing a wear coating includes depositing a wear coating having a thickness between about 1 mm and about 1.5 mm.

17. The method of claim 12, wherein providing a break-in coating includes providing a break-in coating having a thickness between about 10 microns and about 50 microns.

18. A v-grooved power rail, comprising:
    an aluminum body;
    a wear coating deposited on a v-grooved surface of the power rail by a thermal spray process; and
    a break-in coating having a lower hardness than the wear coating deposited on the wear coating using a thermal spray process.

19. The power rail of claim 18, wherein the wear coating includes aluminum and the break-in coating includes at least one of bronze, copper, aluminum, or tin.

20. The power rail of claim 18, wherein a thickness of the wear coating is between about 1 mm and about 1.5 mm, and a thickness of the break-in coating is between about 10 microns and about 50 microns.

* * * * *